(12) United States Patent
Rockenfeller et al.

(10) Patent No.: US 6,224,842 B1
(45) Date of Patent: May 1, 2001

(54) HEAT AND MASS TRANSFER APPARATUS AND METHOD FOR SOLID-VAPOR SORPTION SYSTEMS

(75) Inventors: Uwe Rockenfeller, Boulder City, NV (US); Lance D. Kirol, Wolcott, VT (US); Kaveh Khalili, Boulder City, NV (US); James W. Langeliers, Boulder City, NV (US); William T. Dooley, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/304,763

(22) Filed: May 4, 1999

(51) Int. Cl.⁷ .................................. C01C 1/00; C01B 3/04
(52) U.S. Cl. ...................... 423/352; 423/580.1; 423/645; 423/658.2; 423/659
(58) Field of Search ...................... 423/299, 352, 423/437, 539, 580.1, 659, 644, 658.2, 645; 95/56

(56) References Cited

U.S. PATENT DOCUMENTS

| | | |
|---|---|---|
| Re. 34,259 | 5/1993 | Rockenfeller . |
| 2,241,600 | 5/1941 | Hunsicker . |
| 2,537,720 | 1/1951 | Wagner . |
| 4,292,265 | 9/1981 | Ron et al. . |
| 4,507,263 | 3/1985 | Ron . |
| 4,623,018 | 11/1986 | Takeshita et al. . |
| 4,709,558 | 12/1987 | Matsushita et al. .................. 68/480 |
| 4,906,258 | 3/1990 | Balat et al. . |
| 4,976,117 | 12/1990 | Crozat et al. ......................... 62/480 |
| 5,161,389 | 11/1992 | Rockenfeller et al. . |
| 5,186,020 | 2/1993 | Rockenfeller et al. . |
| 5,271,239 | 12/1993 | Rockenfeller et al. . |
| 5,283,219 | 2/1994 | Mauran et al. . |
| 5,298,231 | 3/1994 | Rockenfeller . |
| 5,328,671 | 7/1994 | Rockenfeller . |
| 5,384,101 | 1/1995 | Rockenfeller . |
| 5,388,637 | 1/1995 | Jones et al. ......................... 165/104 |
| 5,440,899 | 8/1995 | De Beijer et al. ..................... 62/480 |
| 5,441,716 | 8/1995 | Rockenfeller . |
| 5,650,030 | 7/1997 | Kyricos ............................... 156/192 |
| 5,661,986 | 9/1997 | Labranque ............................ 62/480 |
| 5,862,855 | 1/1999 | Balk .................................. 165/104.12 |
| 5,958,098 * | 9/1999 | Heung ................................. 95/56 |

FOREIGN PATENT DOCUMENTS

| | | |
|---|---|---|
| 0 735 123 A1 | 10/1996 | (EP) . |
| 0 738 535 A1 | 10/1996 | (EP) . |
| 0 800 863 A1 | 10/1997 | (EP) . |
| WO 97/32646 | 9/1997 | (WO) . |

* cited by examiner

*Primary Examiner*—Wayne Langel
(74) *Attorney, Agent, or Firm*—Knobbe, Martens, Olson & Bear, LLP

(57) ABSTRACT

A sorber heat exchanger is provided with a substrate material incorporating a sorbent for reacting with a polar gas refrigerant or hydrogen. A preferred sorbent is a metal salt capable of reacting with the polar gas refrigerant to form a complex compound. The sorbent incorporating substrate is loaded into the reactor space between the heat transfer surfaces. Incorporating the sorbent into the substrate reduces sorbent migration thereby improving performance and life expectancy of the heat exchanger.

18 Claims, 7 Drawing Sheets

HEAT AND MASS TRANSFER APPARATUS AND METHOD FOR SOLID-VAPOR SORPTION SYSTEMS

BACKGROUND OF THE INVENTION

Solid gas sorption systems are used to produce cooling and/or heating by repeatedly desorbing and absorbing the gas on a coordinative complex compound formed by absorbing a polar gas refrigerant on a metal salt in a sorption reaction sometimes referred to as chemisorption. Complex compounds incorporating ammonia as the polar gaseous refrigerant are especially advantageous because of their capacity for absorbing large amounts of the refrigerant, often up to 80% of the absorbent dry weight. The complex compounds also exhibit vapor pressure independent of the refrigerant concentration and can be made to absorb and desorb very rapidly. Apparatus using complex compounds to produce cooling are disclosed, for example, in U.S. Pat. Nos. 5,161,389, 5,186,020, and 5,271,239. Improvements in achieving high reaction rates for the complex compounds are achieved by restricting the volumetric expansion of the complex compound formed during the absorption reaction of the gas on the metal salt. The methods and apparatus for achieving such high reaction rates are disclosed in U.S. Pat. Nos. 5,298,231, 5,328,671, 5,384,101 and 5,441,716, the descriptions of which are incorporated herein by reference.

While increased reaction rates have resulted from the aforesaid methods, it has been determined that repeated and relatively long-term absorption and desorption cycling of the complex compounds, particularly those using ammonia as a refrigerant, leads to sorbent migration even in the confined reaction chamber. It has also been found that the sorbent migration increases as higher sorption rates are used. Such migration may lead to uneven sorbent densities which in turn cause force imbalances in the heat exchanger structure, often resulting in deformation of the heat transfer surfaces and/or internal structures. As the heat exchanger structure becomes modified or compromised, heat and mass transfer reductions occur as does the sorption rate of the process. As sorbent migration continues, significant losses in performance efficiency are realized as is the possibility of failure of the reactor especially where it is exposed to high reaction rate sorptions.

Although improvements in attempts to overcome sorbent migration have been made for metal hydrides, such procedures and techniques have not been found to be suitable for ammoniated complex compounds. In U.S. Pat. No. 4,507,263, there is described micro-immobilization for metal hydride using a sintering process in which a metal hydride powder is embedded in a finely divided metal and the mixture sintered in a furnace at 100–200° C. using hydrogen pressure of 250–300 atmospheres. Although such a process reportedly results in mechanical stability for metal hydrides even after 6,000 cycles, the process is not effective for ammoniated complex compounds which exhibit much larger forces as compared to those experienced with metal hydrides. For example, where ammoniated complex compounds are absorbed and/or desorbed above about 3 moles $NH_3$/mole sorbent-hr, the forces exercised on a sintered metal structure are so large as to result in deformation of the structure. Moreover, for most practical applications using complex compound technology, practical life expectancy of the reactors will exceed 6,000 cycles by an order of magnitude.

SUMMARY OF THE INVENTION

In the present invention, a sorber heat exchanger, i.e., a reactor, is provided with a sorbent/substrate composition comprising a substrate material substantially inert to a polar gas and incorporating a salt of a metal on which the polar gas is to be absorbed or with a complex compound formed by absorbing the polar gas on the metal salt. The use of the sorbent/substrate composition results in substantial micro-immobilization of the solid sorbent. According to the invention, it has been found that for sorption processes in which repetitive absorption and/or desorption reactions in excess of 200 repetitions exceed, at least temporarily, reaction rates of 3 moles gas/mole sorbent-hr, sorbent migration is substantially reduced by utilizing a suitable substrate material on or in which complex compounds or metal salts have been incorporated. Reduced sorbent migration improves the performance of the apparatus as well as the sorption cycle capability and expected life of the apparatus. The aforesaid invention is also useful in metal hydride sorption systems in which hydrogen is alternately absorbed or desorbed, particularly if high reaction rates or multiple thousand reaction cycles are desired. Such improvements as well as a more detailed description of the invention are described hereinafter.

DETAILED DESCRIPTION OF THE PREFERRED EMBODIMENT

Figure 1:
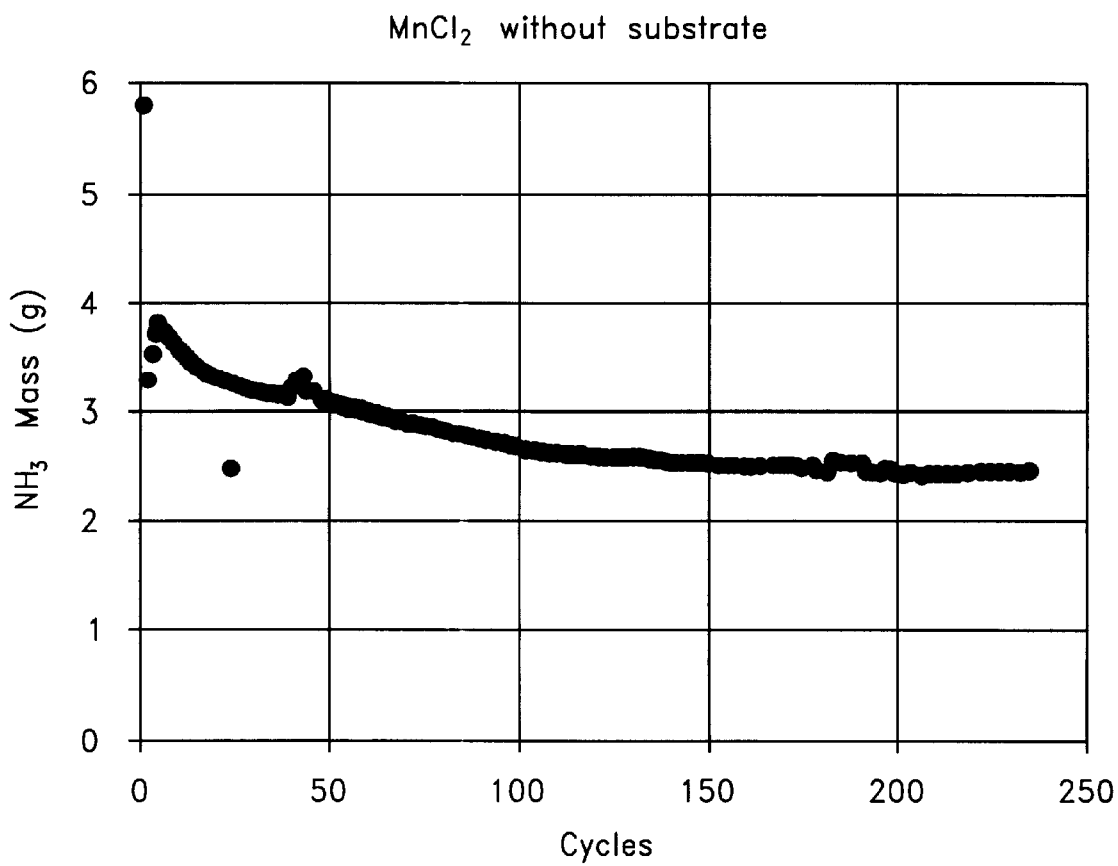
FIGS. 1–6 graphically illustrate comparative sorption rates for different complex compounds carried out in finned tube reactors showing the improvements in using micro-immobilization substrates of the invention.

In patents assigned to Rocky Research, particularly U.S. Pat. Nos. Re. 34,259, 5,298,231, 5,328,671, 5,441,716, 5,025,635, 5,079,928, 5,161,389 and 5,186,020, the terms adsorb and adsorption are used to describe sorption reactions between polar gases and metal salts to form complex compounds as well as the reaction of a polar gas with a complex compound. In the following description the terms absorb and absorption are used to describe these same sorption reactions. Regardless of the terminology used, the sorption reactions of the present invention and as described in the aforesaid patents between a polar gas and a monovariant salt to produce a complex compound are to be distinguished from sorption reactions between a gas and a bi-variant compound such as zeolite, activated carbon or alumina or silica gel.

According to the present invention solid sorbent migration in a reactor in which solid vapor sorption is carried out is substantially reduced or eliminated by incorporating the sorbent on a suitable substrate material. The solid sorbent used in the improved reactors and systems of the invention are metal salts, or complex compounds produced from the salts, or metal hydrides. The substrate material incorporating the metal salt, complex compound or metal hydride may be a woven material such as a fabric or cloth, an unwoven material such as yarn, felt, rope, mat or similar material in which the strands or fibers have been tangled or otherwise mixed, twisted, pressed or packed to form a coherent substrate. Woven fabric layers may be used between unwoven layers of fibers, especially in composites of alternating woven and unwoven fiber layers. Yarn, rope, or strips or ribbons of substrate fabric may also be used for certain reactor heat exchanger designs.

Specific preferred substrate materials include nylon polymers including non-aromatic nylons or polyamids, aromatic polyamides or aramids, fiberglass, and polyphenylene sulfides. The aramids are preferred for complex compounds operating at reaction temperatures below about 150° C. For higher temperatures, fiberglass and polyphenylene sulfides are preferred, while at temperatures below about 120° C., nylon-based polymer materials are also suitable. Aramids are not recommended at reaction temperatures above about 150° C. Substrate materials having a high thermal conductivity are advantageous since they improve heat transfer properties of the heat exchanger sorber core. The thermal conductivity of aforesaid substrate materials may be enhanced by incorporating highly thermal-conductive materials such as fibers, particulates, etc. into the substrate.

To obtain high thermodynamic and mass efficiency of the substrate composition, it is desirable to use a physical form of the material which can be loaded with a high mass fraction of the sorbent. It is preferable that at least 50%, and preferably 70%, and most preferably 85% or more, of the volume of the sorbent/substrate composition comprises the sorbent itself. Thus, a preferred substrate material used to produce the sorbent/substrate composition of the invention has a porosity of about 50% or more and up to about 98%. Examples of types of fabric used to meet such open volume and porosity requirements include textile materials such as cloth, fabric, felt, mat, etc., commonly formed by weaving or knitting, as well as non-woven but cohesive forms such as batt or batting and the like. Woven structures have the advantage of greater strength, although the use of reinforcement layers integrated into any substrate material may be desirable to further increase the strength of the substrate. Where reinforcement layers are used, it is important to control substrate separation at the reinforcement interface. It has been found advantageous to use a substrate material sufficiently gas permeable for the refrigerant gas to pass through and sufficiently low in pore size to prevent small salt particles to penetrate. Although woven materials usually provide superior physical and structural uniformity, the use of non-woven or amorphous fiber substrates may provide for more uniform distribution of solid sorbent throughout the pores, spaces and interstices of the material.

The sorbent is incorporated in the substrate material by embedding or impregnating or otherwise combining the two components to form the sorbent/substrate composition to be installed in a sorber heat exchanger according to the invention. The preferred method of incorporating the sorbent into the substrate material is by impregnation. Such impregnation is carried out by any suitable means such as spraying the substrate material with a liquid solution, slurry, suspension or mixture containing the sorbent or soaking the substrate in a liquid solution, slurry or suspension of the sorbent followed by removal of the solvent or carrier by drying or heating, and/or by applying a vacuum. The slurry or suspension may also be used or mixed with a sorbent compatible binder for stabilizing and further reducing migration of the sorbent in or within the substrate. The substrate may also be impregnated by pumping the salt suspension, slurry or solution or liquid-salt mixture into and through the material, whereby the substrate also functions to filter the impregnating compositions. Yet, other methods for incorporating sorbent into the substrate include embedding or otherwise distributing fine sorbent particles within the substrate using blowing, blasting or sintering methods and techniques. Moreover, the particles may be directed into or combined with the substrate material at the time the substrate felt or fabric is manufactured, or subsequently. The sorbent may also be melted, for example, as a hydrate, and the liquid sorbent applied to the substrate after or during substrate manufacture. Other means for incorporating the sorbent into the material, known to those skilled in the art, may be used. It may be preferred to incorporate the substrate with the absorbent prior to installation in the reactor. However, the substrate may also be installed prior to being impregnated with the solution containing the absorbent salt. It is important that the sorbent is loaded into the substrate using methods and conditions which optimize uniform sorbent distribution in order to achieve advantageous absorption rates and maximum refrigerant uptake, as well as for balancing the expansion forces during absorption phases of the sorption reaction process. It is also preferred to maximize the amount of sorbent incorporated in the substrate. Where the liquid carrier is a solvent for the sorbent, it is preferred to use a saturated salt solution for impregnating the substrate. However, for some cases lower concentrations of salt may be used, for example, where necessitated or dictated to meet permissible loading densities. Where solubility of the desired sorbent in the liquid carrier is not practical or possible, substantially homogenous dispersions should be used during the soaking or embedding process to optimize the uniformity of the sorbent throughout the substrate. Of course, such factors will be considered in selecting suitable equipment and process conditions and parameters (temperature, time, etc.) by those skilled in the art.

Any suitable and effective batch or continuous technique for spraying or soaking the material may be used. In order to optimize the amount of salt impregnated in the substrate it is desirable to use a concentrated, preferably highly concentrated or saturated salt solution, and to saturate the substrate material with the solution. To minimize free standing salt or non-uniform salt agglomeration on the substrate, the solution or mixture may be filtered. Alternatively, it is desirable to allow the saturated salt solution to stand sufficiently, such as overnight, so that solids can settle out. Where settled or free standing salts are present, the liquid solution to be used for soaking the substrate should be carefully withdrawn. The saturated substrate material is then dried under suitable conditions, for example, at elevated temperature and/or vacuum until dry. The substrate may be dried in equipment and under conditions to form a flat layer or any other desired size and shape using a mold or form. The dried saturated substrate will readily hold its shape without being brittle.

Figure 7:
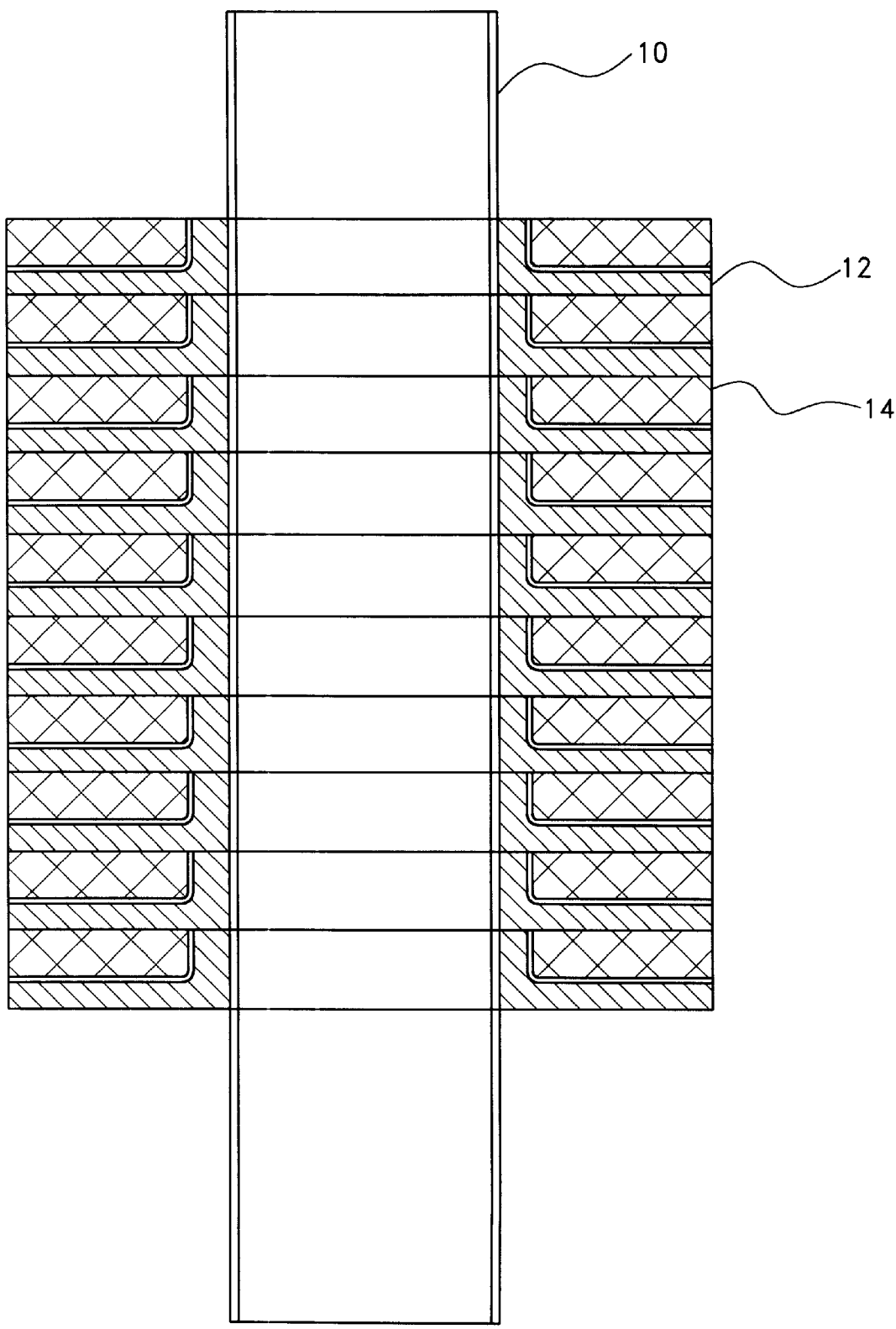
FIG. 7 illustrates an example of a radial fin tube heat exchanger in which a sorbent substrate composition of the invention is installed in the space between fins.

The invention may be used for any size, shape and type of sorber heat exchange reactors. Examples of finned tube and plate reactors are illustrated in U.S. Pat. Nos. 5,441,716 and 5,298,231. Other useful reactors are those incorporating spiral finned tube designs and plate stacks of various designs. Thus, different shapes and sizes of sorbent incorporating substrate material may be required to adequately fill the reactor spaces. The sorbent/substrate material is installed using one or more layers of the sorbent incorporating substrate or the substrate to be impregnated with the sorbent into the space between at least a portion and preferably between all of the heat exchange surfaces in the sorber. The installation of the substrate is such that the space between the heat exchanger surfaces, i.e., fins, plates, etc., will be substantially filled with the substrate material, as illustrated in FIG. 7. With the substrate containing 50%–85% by volume or more of the incorporated solid sorbent, at least a major amount of the space between reactor heat exchanger surfaces is filled with the sorbent. The dried substrate may be readily cut to a desired shape and size to be installed between the spaces between the reactor heat exchange surface, i.e., fins, plates, etc. Flat substrate layers may be preferred for reactor designs having flat, parallel fins or plates since the layers are readily stacked to fill the space between the fins or plates. Multiple tubed-finned or plate heat exchanger designs may incorporate the substrate materials as inserts in the gas diffusion slots. Where the invention is used for spiral finned reactors, ribbons, strips or yarn of substrate are conveniently wrapped or wound along the spiral spaces. Preferably, layers of the salt impregnated substrate are stacked or wrapped between the fins or plates to substantially fill the space without stuffing, cramming or unduly forcing the material into the open or available space. To prevent the sorbent material from migrating off leading edges of the substrate circumference, it is desirable to use a holding wrapper such as one made of fine wire mesh or substrate material which preferably has not been loaded with the sorbent. As previously stated, an alternative embodiment of the invention is to install the substrate in the space between the reactor heat exchange surfaces prior to incorporating sorbent into the substrate. This embodiment may be especially useful where the shape and/or dimensions of the space to be filled makes it easier to fill with the more flexible untreated substrate, and thereafter treating and drying the substrate. Depending on the depth of substrate to be installed it may be advantageous or necessary to install, impregnate and dry successive layers of the substrate.

It is especially important to substantially fill the reactor space with substrate incorporating metal salt to be reacted with ammonia to form a complex compound. Such complex compounds will expand substantially unless volumetrically restricted as described in U.S. Pat. No. 5,441,716. By so filling the reactor space with salt incorporated substrate, the initial absorption reaction with polar gas refrigerant, preferably ammonia, will result in complex compounds having improved reaction rates as described in the aforesaid patent. The complex compounds and the metal salts of which they are formed to be used in the substrate material are described in the aforesaid U.S. patents, particularly U.S. Pat. Nos. 5,298,321, 5,328,671, 5,441,716 and Re 34,259, all of which are incorporated herein by reference. The preferred salts are the halide, nitrate, nitrite, oxalate, perchlorate, sulfate or sulfite of alkali, alkaline earth, transition metals and zinc, cadmium, tin, aluminum and double metal halides of the aforesaid metals. Sodium borofluoride is also a preferred salt. Specific preferred salts are $SrCl_2$, $CaCl_2$, $CaBr_2$, $CaI_2$, $FeCl_2$, $FeBr_2$, $CoCl_2$, $MnCl_2$, $MnBr_2$, $SrBr_2$, $MgCl_2$, $MgBr_2$, $BaCl_2$, $LiCl$, and $LiBr$ and mixtures of two or more of the salts. Specific coordination steps for ammoniated complex compounds of the aforesaid preferred salts are listed in U.S. Pat. No. 5,441,716. The polar gas to be used in preparing the complex compound is reacted with the metal salt within the reaction chambers under conditions as described in the aforesaid U.S. Pat. Nos. 5,441,716 and 5,298,231. Preferred polar gas compounds are water, amines and alcohols and most preferably ammonia. Again, the volumetric expansion of the complex compound formed during the initial adsorption reaction is restricted whereby the resulting complex compound is at least a partially structurally immobilized, self-supporting, coherent reaction mass as described in U.S. Pat. No. 5,328,671. Most preferred complex compounds are $SrCl_2.1-8(NH_3)$, $CaCl_2.1-2(NH_3)$, $CaCl_2.2-4(NH_3)$, $CaCl_2.4-8(NH_3)$, $CaBr_2.2-6(NH_3)$, $CoCl_2.2-6(NH_3)$, $(FeCl_2.2-6(NH_3)$, $FeBr_2.2-6(NH_3)$, $BaCl_2.0-8(NH_3)$, $CaI_2.2-6(NH_3)$, $MgBr_2.2-6(NH_3)$, $MrBr_2.2-6(NH_3)$, $MnCl_2.2-6(NH_3)$ and $MgCl_2.2-6(NH_3)$.

The mass diffusion path of the reactors is the distance a gas molecule must travel between the gas distribution surface and the absorbent particle. The specific description and definition of the mass diffusion path length is disclosed in U.S. Pat. No. 5,441,716 and is incorporated herein by reference. In reactors using ammonia as the refrigerant and ammoniated complex compounds, the mean maximum mass diffusion path is preferably below about 15 mm, which corresponds to the preferred mean mass diffusion path length described in the aforesaid incorporated patent. Optimum dimensions are a function of the specific sorbents and refrigerants used in the process, and the operating pressures, approach pressures and temperatures as well as the sorbent loading density and of the substrate material gas permeability. Preferred mean mass diffusion path lengths are below about 15 mm and most preferred are below about 12 mm. The thermal diffusion or thermal path length is dependent on the distance between adjacent heat exchange surfaces, more specifically, the distance from the nearest highly thermally conductive surface to the center of the absorbent mass. For example, for a reactor of the type illustrated in FIG. 7, the thermal path length is one-half of the distance between adjacent fins. Preferably, the thermal path length is less than 4.5 mm, more preferably less than 4 mm and most preferably about 3.0 mm or less. Thus, for finned tube heat exchanger designs, such a thermal path length is equivalent to a reactor fin count of at least four fins per inch of the length (height) of the reactor module. Preferred reactor fin counts are between about 9 and 25 fins per inch (1.4 mm to 0.5 mm thermal path length).

The heat exchanger sorber core may be further improved by use of highly thermal conductive materials such as metals or carbon fibers. The incorporation of such materials or additives in the substrate material will allow the use of finned tube heat exchangers having a lower fin count or less fins per inch than otherwise disclosed in the aforementioned patents. Thus, substrate fabric or felt may contain, in its woven structure, thermally conductive metal, carbon or graphite fiber or particles. The use of such thermally conductive materials is particularly suitable and even preferable where the substrate material is of relatively low thermal conductivity. For example, glass fiber, known for its low thermal conductivity, will be substantially improved by incorporating such thermally conductive fibers. Preferably, the substrate used according to the invention will have a thermal conductivity of at least 50% more than a glass fiber felt or fabric which has not been modified to include such thermally conductive fibers or particles or otherwise treated to increase thermal conductivity from that of untreated or unmodified glass fiber material. The presence of such thermally conductive materials in the substrate is not limited to glass fiber, and may be used for the nylon, aramid and polyphenylene sulfide polymer substrates as well. Alternatively, the substrate compositions may be produced with the highly conductive material present in the glass fibers or polymer fibers used for weaving and preparing the felt or fabric.

The following examples illustrate preparation of salt impregnated substrate materials according to the present invention:

EXAMPLE I

A manganese chloride impregnated substrate felt was prepared by mixing 75.4 grams $MnCl_2$ per 100 g distilled $H_2O$. The salt was slowly added to the water with thorough and continuous mixing at temperatures below 50° C. until all of the salt was dissolved. The solution was allowed to stand overnight at room temperature to allow the solids to settle. The clean solution was carefully withdrawn by slowly pumping or siphoning near the liquid surface. The 43% $MnCl_2$ solution had a density of 1.48 g/cm$^3$ at 25° C.

A polyphenylene sulfide felt (Ryton®) single-layer, MFM scrimless, was soaked in the solution. The felt layer was 0.08 in (2 mm) thick having a weight of 18 oz/yd$^2$ (0.061 g/cm$^2$). Excess solution was drained and a single layer of cloth was placed in an oven on a stainless steel rack having a 3 mm grid/stainless steel wire mesh top surface for keeping the wet felt from sagging and open for good air circulation. The oven was heated to 200° C. and the cloth was dried for 3–4 hours. The dry impregnated cloth was substantially flat and capable of holding its weight and shape without brittleness. The cloth was cut into donut-shaped circles of a size for being fitted into the space between fins as illustrated in FIG. 7.

EXAMPLE II

A 45% (by weight) calcium bromide solution was prepared by mixing 81.8 g anhydrous CaBr$_2$ per 100 g distilled water. The salt was added slowly while continually mixing to prevent the solution temperature from exceeding 50° C. Mixing was continued until all of the salt was dissolved. The solution was allowed to stand at room temperature to settle the solids out after which the clear solution was carefully withdrawn by siphoning near the liquid surface. The density of the solution was 1.55 g/cm$^3$ at 25° C.

A needled felt of 100% Ryton® polyphenylene sulfide of 0.065 in.–0.085 in. having a weight of 16 oz/yd$^2$ and 30–50 CFM/ft$^2$ permeability was used as the substrate. The fabric was thoroughly soaked in the calcium bromide solution until it was completely saturated after which excess solution was drained. The single layer cloth was dried on a stainless steel rack in an oven at 160° C. for 3–4 hours. After drying, the impregnated fabric layer which was somewhat stiffened without brittleness was cut to the desired size and shape for installation in a sorber heat exchanger.

EXAMPLE III

A 43% (by weight) aqueous SrCl$_2$ solution was prepared by slowly adding the anhydrous salt to water with continuous stirring at a rate to avoid a solution temperature above 80° C. Vigorous shaking or stirring is avoided to prevent unnecessary exposure to air which results in CO$_2$ reaction to undesirably form a carbonate. The solution is allowed to stand overnight at above 60° C. to prevent freezing and to settle solids out and the clean clear liquor is slowly pumped or siphoned near the liquid surface.

Single-layer Ryton® polyphenylene sulfide fabric as used in Example I is heated to 60° C. The heated felt is then soaked in the solution until completely saturated and then drained. About 0.25 g solution per cm$^2$ of felt is required to completely saturate the material. The saturated felt is dried in an oven overnight at room temperature, then 1 hour at 55° C., 1 hour at 125° C. and 2 hours at 160° C. The dried impregnated felt contains about 61%–62%, by weight, SrCl$_2$ weighing about 0.16 g/cm$^2$. The impregnated substrate material is cut to the desired size and shape and loaded into the space between sorber reactor fins.

The impregnated substrate materials prepared according to the above examples were loaded into the sorber reactors by stacking layers of the material that were cut to the shape and size of the sorber fins. The reactor used for the testing was a radial fin reactor similar to that illustrated in FIGS. 1 and 2 of U.S. Pat. No. 5,441,716 and further illustrated in FIG. 7 herein. As shown in FIG. 7, the reactor consists of a plurality of plates or fins 12 extending radially from heat transfer fluid conduit 10. Between each of the fins 12 are stacked layers 14 of disks of the impregnated substrate material prepared as previously described. The impregnated Ryton® felt disks 14 are installed so as to substantially fill the cavity between the reactor fins without unduly cramming or stuffing them into the space. To illustrate the improvements achieved by filling the reactor spaces with the impregnated substrate materials as compared to reactors in which the powdered salt is loaded into the reactor spaces according to the aforesaid patents, each of the impregnated substrates prepared according to Examples I–III were tested by absorbing and desorbing ammonia in the reactors.

Figure 2:
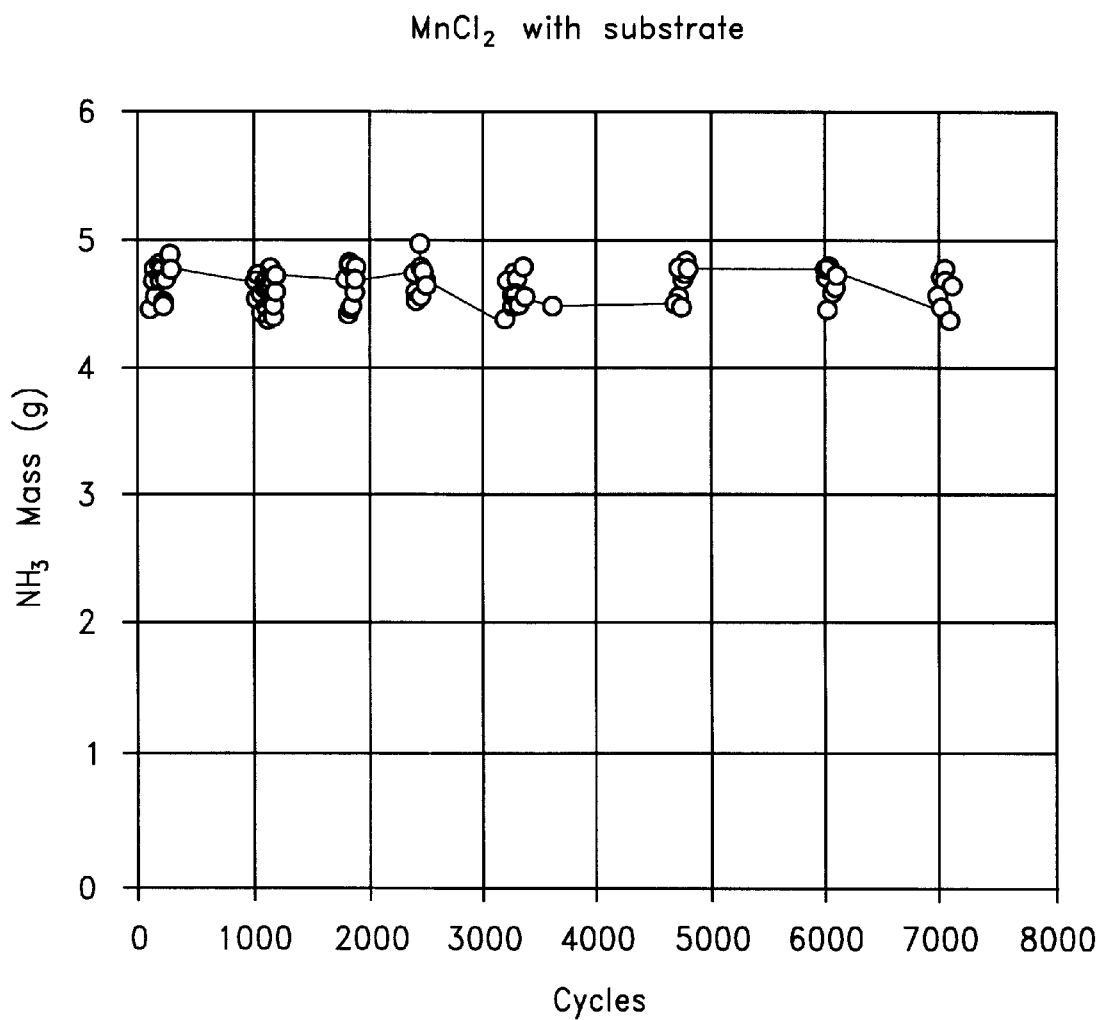
Figure 3:
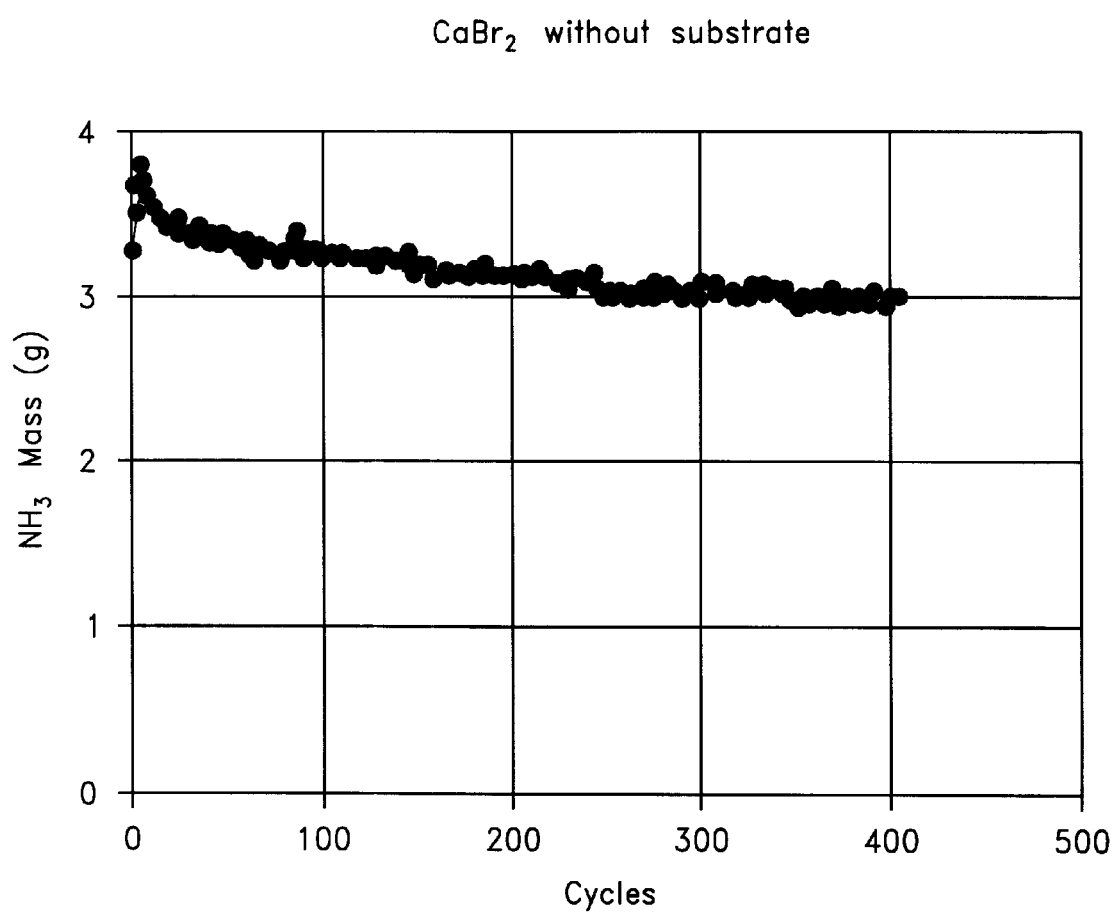
Figure 4:
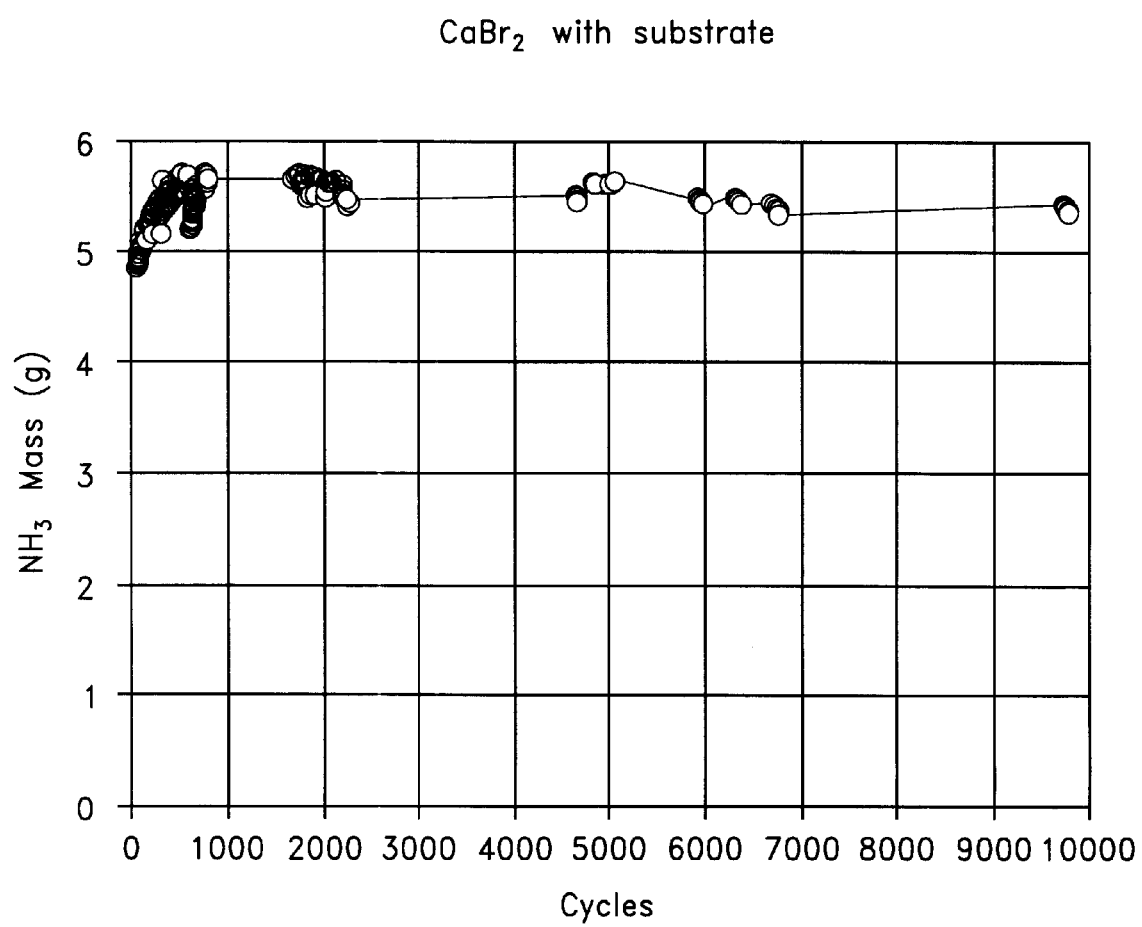
Figure 5:
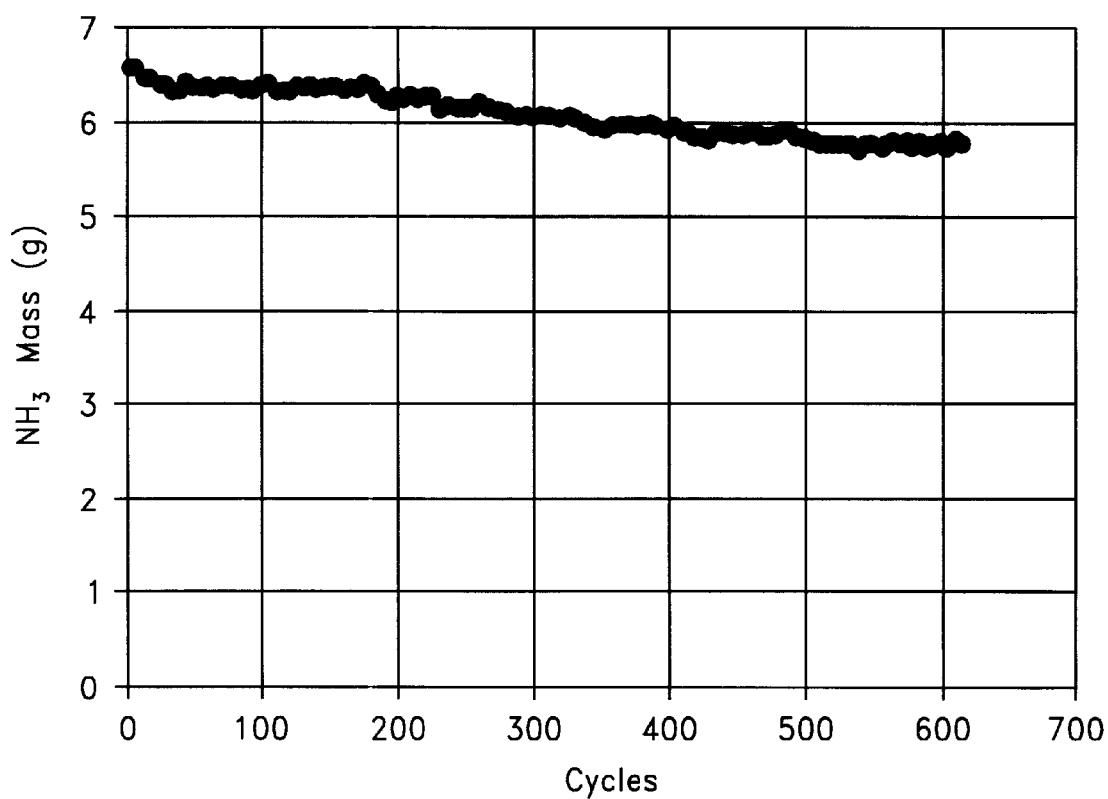
Figure 6:
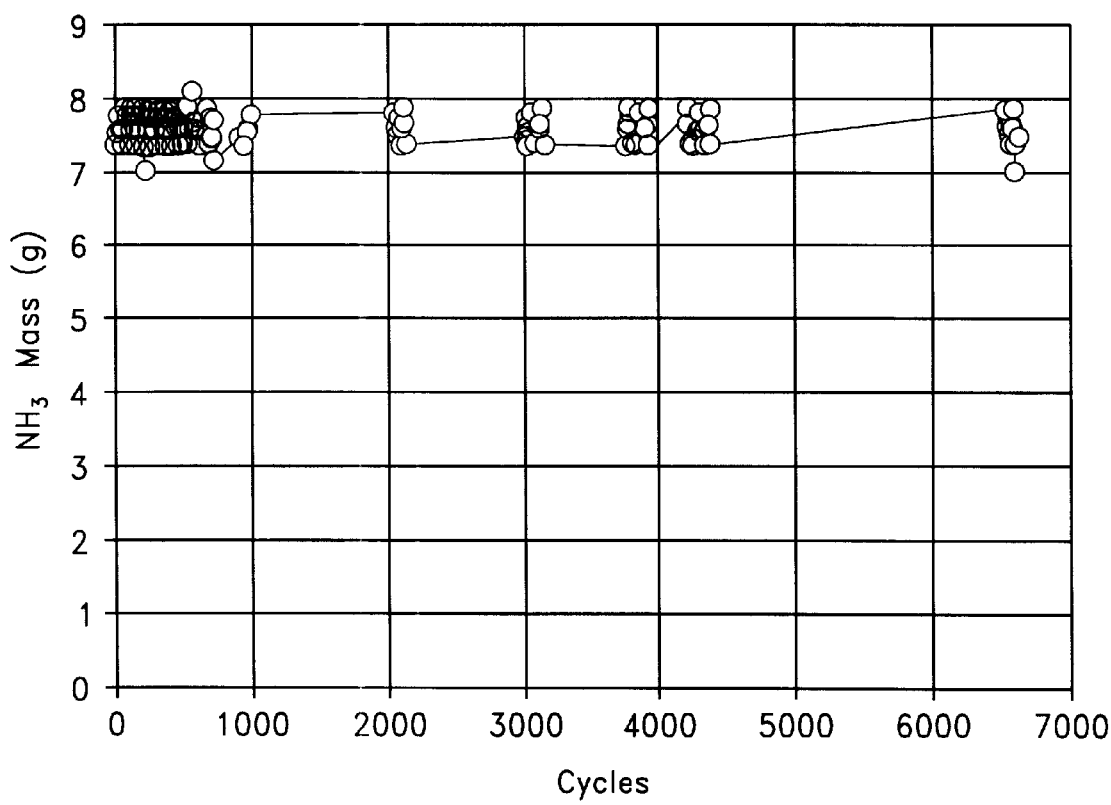

FIGS. 1 and 2 illustrate the comparison of the sorption rate degradation of MnCl$_2$—NH$_3$ complex compound in a finned-tube heat exchanger shown in FIG. 7. The reactor used for the process shown in FIG. 1 was loaded with MnCl$_2$ powder. FIG. 2 illustrates the sorption rate integrity for the same complex compound in a finned-tube heat exchanger utilizing impregnated substrate prepared as described in Example I. FIGS. 3 and 4 illustrate examples comparing the reaction rates for CaBr$_2$—NH$_3$ complex compound sorption systems. The process of FIG. 3 used CaBr$_2$ powder in the reactor space whereas the example illustrated in FIG. 4 used a substrate material described in Example II. FIGS. 5 and 6 illustrate the comparison using SrCl$_2$—NH$_3$ complex compound. In FIG. 5, the reactor space was loaded with SrCl$_2$ powder; in FIG. 6, the space was filled with impregnated felt prepared according to Example III.

In the examples shown in FIGS. 1–6, the ammonia uptake was taken at fixed cycle times and at absorption and desorption reaction cycle time periods of less than 30 minutes, respectively. The reaction conditions used for comparing the same salts were substantially identical. From the results shown in FIGS. 1–6, it is evident that the ammonia uptake, i.e., the mass of ammonia absorbed and desorbed on the complex compound, is substantially increased where an impregnated substrate is used for micro-immobilization of the complex compounds. A reduction in the ammonia uptake is equivalent to a reduced reaction rate in the absorption and desorption reaction cycles and for a given time-temperature-pressure condition translates to reduced energy storage capacity, of particular importance in the efficiency of cold-storage, heat-storage and dual temperature storage systems.

Other improvements realized by using the apparatus and method of the invention using ammoniated complex compounds include the capability of carrying out the sorption process to obtain at least 70% of the theoretical uptake of the ammonia at approach temperatures of 10 K or less during a cycle. In the specific examples using SrCl$_2$.(1–8)NH$_3$, at least 5 moles of ammonia per mole of SrCl$_2$ are absorbed and/or desorbed at approach temperatures of 10 k or less. Similar results are achieved using CaCl$_2$.2–4(NH$_3$) and CaCl$_2$.4–8(NH$_3$). In addition to the aforesaid improvements, reactors incorporating absorbent impregnated substrate according to the invention have a much longer life expectancy as compared to prior art reactors in which the salts are simply loaded into the spaces between fins and tubes. By way of example, a reactor of the design shown in FIG. 7 using a SrCl$_2$ impregnated substrate as prepared in Example III was examined after over 4,000 cycles of alternating absorption/desorption reactions, and showed substantially no fin deterioration or deformation. By comparison, a finned reactor of the same design loaded with SrCl$_2$ according to the prior art showed substantial fin deformity after only 450 cycles under substantially similar reaction conditions.

The use of sorbent incorporating substrate in substantially filling the reactor space between heat exchange surfaces according to the present invention is to be distinguished from the use of relatively thin discs, tubes, sheets, etc. of gas permeable material as illustrated and described in U.S. Pat.

No. 5,441,716. In the aforesaid patent such materials occupy only a relatively minor portion of the space between heat exchange surfaces which is otherwise filled with the solid absorbent itself. Moreover, such material does not incorporate the absorbent.

Although the invention described above achieves significant improvements in complex compound systems, it may also be used advantageously for other sorption systems, particularly for metal hydrides where sorbent mobilization is often a problem. Examples of metal hydrides used and improved using the methods and apparatus of the invention are disclosed in U.S. Pat. Nos. 4,523,635 and 4,623,018, incorporated herein by reference.

What is claimed is:

1. A method of improving a sorption process in which a polar gas is repeatedly alternately absorbed and desorbed on a complex compound formed by absorbing said polar gas on a metal salt or in which hydrogen is repeatedly alternately absorbed and desorbed on a metal hydride, said method comprising:

embedding or impregnating said metal salt or a hydridable metal or metal hydride in woven or unwoven strands or fibers of a substrate material comprising fabric, cloth, yarn, felt, rope or mat to form a sorbent/substrate composition, said substrate material being inert to said polar gas or hydrogen;

absorbing a polar gas on said embedded or impregnated salt to form said complex compound and restricting the volumetric expansion of said complex compound formed during the absorption reaction, or absorbing hydrogen on said embedded or impregnated hydridable metal or metal hydride; and carrying out said sorption process using said sorbent/substrate composition.

2. The method of claim 1 wherein at least a portion of the reaction process is carried out at a rate greater than 3 moles gas/mole sorbent-hr.

3. A method of claim 1 in which the sorption process comprises an absorption and/or desorption performed in excess of 200 repetitions.

4. A method of claim 1 in which said sorption process utilizes an ammoniated complex compound and wherein said complex compound absorbs and/or desorbs at least 10 mg of ammonia per cc of sorbent per minute of absorption or desorption cycle time.

5. A method of claim 1 in which said sorption process utilizes an ammoniated complex compound and in which said sorption process is carried out to obtain at least 70% of the theoretical uptake of ammonia at approach temperatures of 10 K or less during a cycle.

6. The method of claim 5 in which the complex compound is $SrCl_2.(1-8)NH_3$ and wherein the sorption process is carried out to react at least 5 moles of ammonia per mole of $SrCl_2$ between $SrCl_2.1\ NH_3$ and $SrCl_2.8\ NH_3$ at approach temperatures of 10 K or less.

7. The method of claim 5 wherein the complex compound is an ammoniated compound comprising $CaCl_2$ in its coordination steps $CaCl_2.1/2(NH_3)$, $CaCl_2.2/4(NH_3)$, $CaCl_2.4/8(NH_3)$ or a combination thereof.

8. The method of claim 5 wherein the complex compound is $CaBr_2.2-6(NH_3)$.

9. The method of claim 5 wherein the complex compound is $CoCl_2.2-6(NH_3)$.

10. The method of claim 5 wherein the complex compound is $FeBr_2.2-6(NH_3)$.

11. The method of claim 5 wherein the complex compound is $FeCl_2.2-6(NH_3)$.

12. The method of claim 5 wherein the complex compound is $BaCl_2.0-8(NH_3)$.

13. The method of claim 5 wherein the complex compound is $CaI_2.2-6(NH_3)$.

14. The method of claim 5 wherein the complex compound is $MgCl_2.2-6(NH_3)$.

15. The method of claim 5 wherein the complex compound is $MgBr_2.2-6(NH_3)$.

16. The method of claim 5 wherein the complex compound is $MnCl_2.2-6(NH_3)$.

17. The method of claim 5 wherein the complex compound is $MnBr_2.2-6(NH_3)$.

18. The method of claim 1 wherein said substrate material has a porosity of between about 50% and about 98%.

* * * * *